K. KATHER.
SAUSAGE MAKING MACHINE.
APPLICATION FILED JAN. 27, 1909.
999,311.
Patented Aug. 1, 1911.
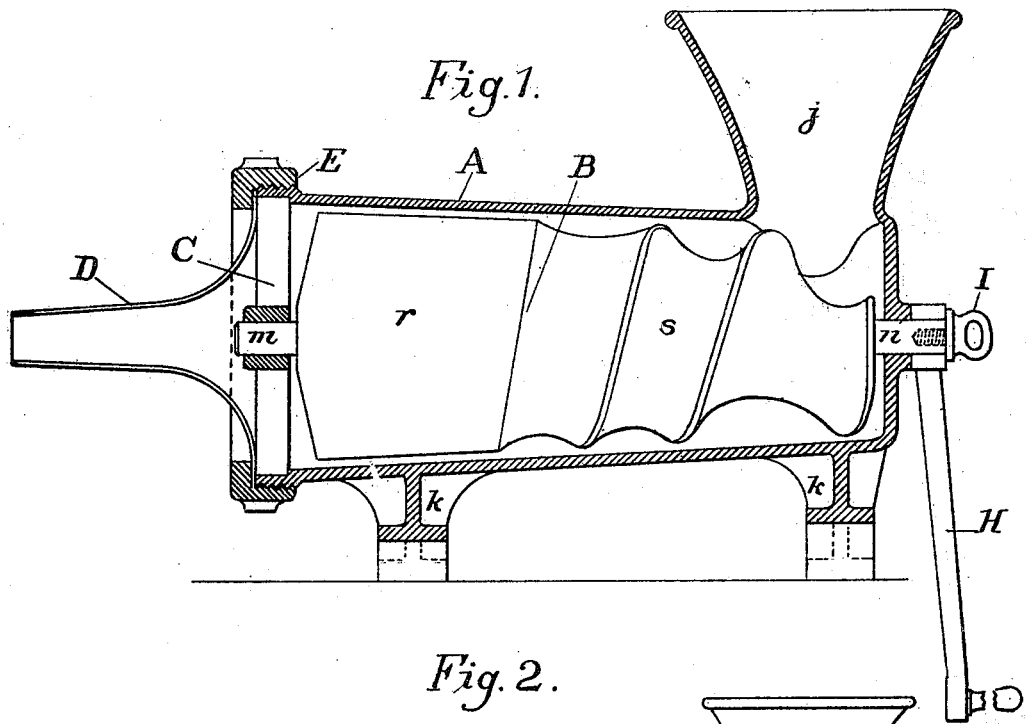
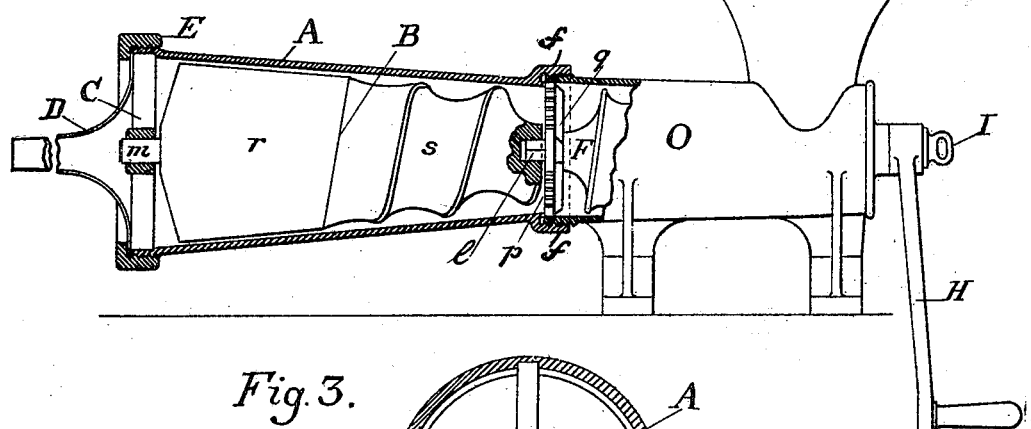
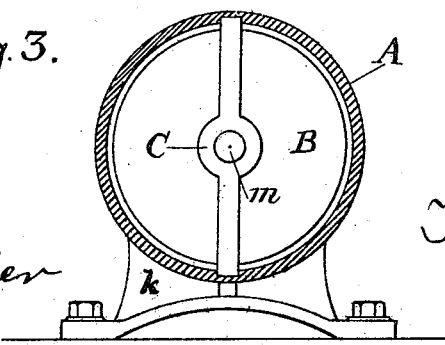
Witnesses
Geo. F. Schild
D. Gruettner
Inventor
Konrad Kather

UNITED STATES PATENT OFFICE.

KONRAD KATHER, OF VALLEJO, CALIFORNIA, ASSIGNOR OF ONE-HALF TO FRANK T. BRUGGEMAN, OF SAN FRANCISCO, CALIFORNIA.

SAUSAGE-MAKING MACHINE.

999,311. Specification of Letters Patent. Patented Aug. 1, 1911.

Application filed January 27, 1909. Serial No. 474,621.

*To all whom it may concern:*

Be it known that I, KONRAD KATHER, a citizen of the United States, residing at Vallejo, in the county of Solano and State of California, have invented a new and useful Sausage-Making Machine, of which the following is a specification.

My invention relates to improvements in sausage making machines, and the object of my improvements are, first, to provide a continuously feeding machine in which by its construction the ingredients of the sausage, the meat, the fat, the spices, and the necessary amount of water are rubbed or kneaded together before entering the casings. I attain these objects by the mechanism illustrated in the accompanying drawing, in which—

Figure 1 is a vertical section of the entire machine; Fig. 2 is a vertical section of the entire machine in combination with a common rotary screw fed meat chopper; Fig. 3 is an end view of the machine.

Similar letters refer to similar parts throughout the several views.

The cast iron tinned barrel A, has a cylindrical slightly cone shaped body, open at the larger end and having a hole in the center of the closed smaller end for the passage of the spindle $n$, of the feeder B. Near the smaller end the barrel A has a funnel shaped opening $j$, for the entrance of the meat and the water, and on the opposite side legs $k$, $k$, for securing the machine. At the larger end the barrel A, is provided with a screw thread.

The feeder B, consists of the screw part $s$, and the conical rubbing part $r$, having almost the same diameter as the inside of barrel A, into which it enters. The feeder B, is provided at the screw end with the spindle $n$, that passes through the closed end of the barrel A, and receives the crank H, and the thumb-screw I that secures the crank H. Concentric with spindle $n$, the feeder B, has on the other end the spindle $m$.

The bearing C, fits into recesses of the larger end of the barrel A, and receives the spindle $m$. The metal stuffer tube D, of funnel shape, fits over the open end of barrel A and the bearing C.

The ring E, screws over the barrel A and retains and secures the stuffer tube D to the bearing C.

The screw part $s$, of the feeder B takes the substance thrown into the opening $j$, of the barrel A up and feeds it into the conical part $r$, where it is thoroughly rubbed together and thence through the stuffer tube D into the casing of the sausage.

To apply this invention as an attachment directly to a meat chopper O, as shown in Fig. 2 the funnel shaped receiver $j$, and legs $k$, $k$, are omitted. The smaller end of barrel A, is also open and is provided with a threaded rim $f$, fitting over the threaded part of meat chopper O.

To transfer the revolving motion of the feed screw F of meat chopper O, by the crank H, to the feeder B of the sausage making machine, the screw end of the feeder B, is provided with a square hole into which the squared end part of the spindle $l$, of the feed screw F, of the meat chopper O passes. The spindle $l$, carries the knife $g$, and is supported by the perforated plate $p$. By screwing the barrel A, to the meat chopper O, the rim $f$, secures the plate $p$, and presses the same toward the knife $g$. On the drawings I show for simplicity sake hand power only, for large machines I would apply steam or electrical power.

I am aware that prior to my invention similar machines with feed screws have been made for chopping meat only, and also that meat choppers are in use with sausage stuffing attachments, I therefore do not claim such combinations broadly but

I claim:

A sausage making machine consisting of a substantially cylindrical casing formed of two cylindrical sections, detachably connected together, a feeding hopper carried by one of said sections, a meat feeding and disintegrating member in said latter section, a perforated cutter bed plate mounted within said casing at the junction of said sections, a cutter operating against said bed plate and operated by said meat feeding and disintegrating member, a conical meat mashing member having a smooth periphery in the other cylindrical section, means projecting through said bed plate for connecting said meat mashing member to said feeding and disintegrating member to permit the rotation of the former by the latter, a delivery spout carried by the outer end of said other cylindrical section and operating means connected to the feeding and disintegrating member to rotate the same.

KONRAD KATHER.

Witnesses:
   Geo. F. Schild,
   D. Gruettner.